United States Patent [19]

Pope

[11] Patent Number: 5,284,347
[45] Date of Patent: Feb. 8, 1994

[54] GAS BEARING SEALING MEANS

[75] Inventor: Adam N. Pope, Cincinnati, Ohio

[73] Assignee: General Electric Company, Cincinnati, Ohio

[21] Appl. No.: 968,220

[22] Filed: Oct. 29, 1992

Related U.S. Application Data

[63] Continuation of Ser. No. 675,977, Mar. 25, 1991, abandoned.

[51] Int. Cl.⁵ .............................................. F16J 15/16
[52] U.S. Cl. .................................... 277/1; 277/53; 277/54; 277/74; 277/26; 277/DIG. 5; 415/48; 415/115; 415/174.5
[58] Field of Search .................... 277/1, 53, 54, 55, 74, 277/75, 81 R, 96, 82, 83, DIG. 5, 26; 415/47, 48, 49, 111, 115, 116, 170.1, 174.5, 173.7

[56] References Cited

U.S. PATENT DOCUMENTS

| 2,675,672 | 4/1954 | Schorner | 415/173.7 X |
|---|---|---|---|
| 3,018,113 | 1/1962 | Hall | 277/53 |
| 3,019,035 | 1/1962 | Klompas | 277/54 X |
| 3,383,033 | 5/1968 | Moore | 230/132 |
| 3,408,048 | 10/1968 | Scalzo | 253/78 |
| 3,529,906 | 9/1970 | McLaurin et al. | 415/180 |
| 3,546,882 | 12/1970 | Berkey | 60/204 |
| 3,565,545 | 2/1971 | Bobo et al. | 416/90 |
| 3,647,311 | 3/1972 | Wootton et al. | 415/113 |
| 3,754,834 | 8/1973 | Wolters | 415/110 |
| 4,049,361 | 9/1977 | Chacour | 415/170.1 X |
| 4,057,362 | 11/1977 | Schwaebel | 415/170 |
| 4,084,919 | 4/1978 | Morris, Jr. et al. | 415/173.7 X |
| 4,247,247 | 1/1981 | Thebert | 415/113 |
| 4,320,903 | 3/1982 | Ayache et al. | 415/174.5 X |
| 4,334,822 | 1/1982 | Rossmann | 415/113 |
| 4,375,891 | 3/1983 | Pask | 415/115 X |
| 4,451,200 | 5/1984 | Libertini et al. | 415/111 X |
| 4,566,851 | 1/1986 | Comeau et al. | 415/115 X |
| 4,648,792 | 3/1987 | Baran, Jr. et al. | 415/139 |
| 4,725,206 | 2/1988 | Glaser et al. | 415/175 X |
| 4,732,531 | 3/1988 | Minoda et al. | 415/115 |
| 4,842,249 | 6/1989 | Weigand | 72/392 X |
| 5,127,793 | 7/1992 | Walker et al. | 415/115 |
| 5,174,584 | 12/1992 | Lahrman | 277/74 |

OTHER PUBLICATIONS

NASA TN D-6563, Design Study of Shaft Face Seal with Self Acting Life Augmentation, by Ludwig and Johnson, Dec. 1971, pp. 1–19.

NASA CR72737, Development of Mainshaft Seals for Advanced Air Breathing Propulsion Systems, by Povinelli and Mckibbin, Jun. 23, 1970, pp. 65–75.

Primary Examiner—William A. Cuchlinski, Jr.
Assistant Examiner—James K. Folker
Attorney, Agent, or Firm—Jerome C. Squillaro; John R. Rafter

[57] ABSTRACT

A gas bearing face seal assembly for a gas turbine engine having improved sealing characteristics. The assembly can include support means which concentrically position a face seal member with respect to a seal radius, while permitting translation of the face seal with respect to a rotating sealing surface and radial growth of the seal member with respect to the housing. A clearance control ring means can be included to reduce and maintain radial clearance between the face seal member and a housing surface. The face seal member may be pressurized radially outwardly, and can include improved vent channel and vent passage means.

30 Claims, 8 Drawing Sheets

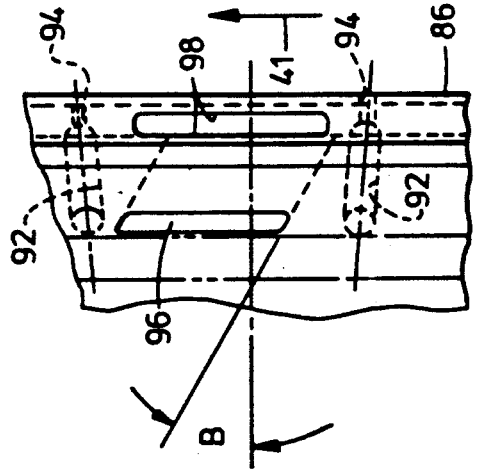
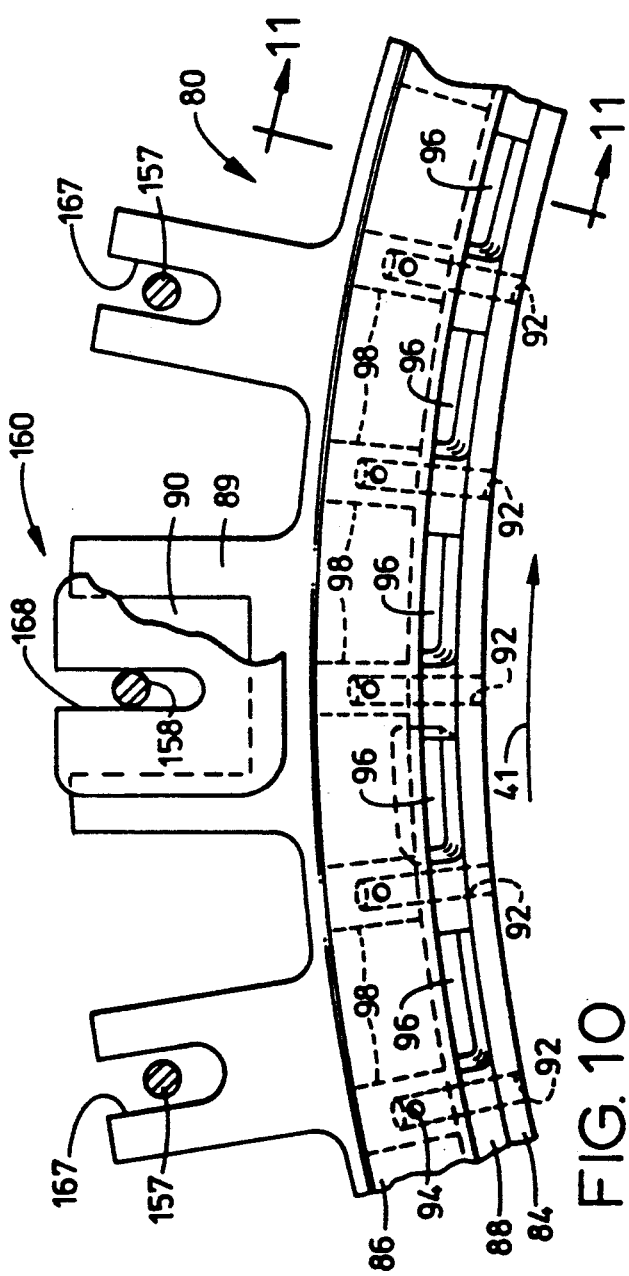
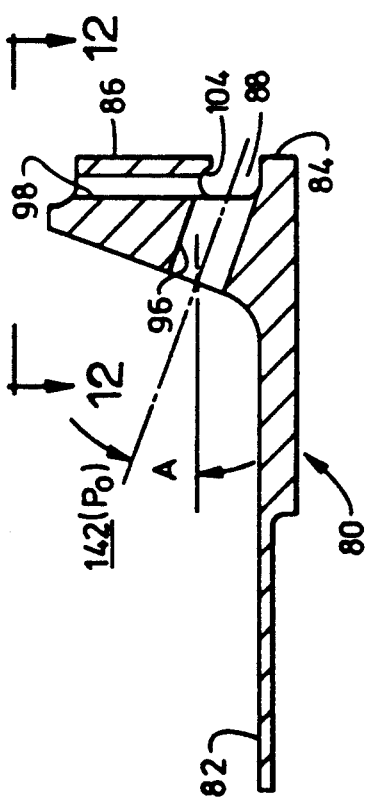

GAS BEARING SEALING MEANS

This application is a continuation of application Ser. No. 07/675,977, filed Mar. 25, 1991, now abandoned.

BACKGROUND OF THE INVENTION

1. Field of the Invention

The present invention relates to seals in gas turbine engines to restrict fluid flow between rotating and stationary engine members, and more particularly is related to a gas bearing face seal having improved sealing characteristics.

2. Description of the Known Art

Air leakage through gas turbine engine seals may significantly increase fuel consumption, reduce engine efficiency, and increase maintenance costs by increasing turbine inlet temperatures. Gas turbine engines have traditionally included labyrinth seals at critical sealing locations. Labyrinth seals control leakage of high pressure gas, such as compressor discharge air, from a generally high pressure area to a generally low pressure area. The seals operate by throttling gas flow through a series of annular constrictions formed between annular teeth, which may be located on a rotating component, and an annular rub strip, which may be located on a stationary engine member. The rub strips are abradable to allow the teeth to rub lightly during dynamic operating conditions, such as thermal transients or maneuver loads. The effectiveness of these labyrinth seals is dependent on keeping the radial clearance between the rub strip and teeth to a minimum. However, the minimum radial clearance is limited by manufacturing tolerances, rotor concentricity control, and thermal growth between rotating and stationary components. Too small a radial clearance results in premature seal wear and possible engine damage, while too large a radial clearance results in excess leakage. As seal diameters increase and gas temperatures increase in advanced engines, the radial clearance must increase, thereby lowering the effectiveness of the labyrinth seals.

Gas bearing face seals provide an alternative to the labyrinth seal. U.S. Pat. No. 3,383,033, issued to C. Moore, and assigned to the assignee of the present invention, discloses a gas bearing face seal for use as a compressor discharge seal, and is incorporated herein in its entirety by reference. An air bearing is used to actively control the spacing between a flow restricting tooth and a rotating sealing surface on a rotating component. A face seal ring member, which carries the restricting tooth, is supported for movement toward the rotating sealing surface. A ring seal, such as a piston ring seal, provides a secondary seal between the ring member and a stationary engine frame.

During low or no power conditions the ring member and restricting tooth are biased away from the rotating sealing surface by springs. During higher power operation high pressure compressor discharge air acts on the ring to urge the ring and tooth toward the sealing surface. A portion of the high pressure discharge air is supplied to a gas bearing space between the ring and the rotating sealing surface to establish a predetermined gas bearing face clearance. Pressure forces developed in the gas bearing space oppose further motion of the ring and tooth toward the sealing surface, and permits close spacing of the restricting tooth with respect to the sealing surface by actively maintaining the predetermined clearance. Further motion of the ring and tooth toward the rotating sealing surface increases the pressure forces in the air bearing space, thereby urging the ring and tooth away from the sealing surface to maintain the predetermined clearance.

While the seal as disclosed in U.S. Pat. No. 3,383,033 attempts to overcome disadvantages of the labyrinth seal, the disclosed seal, itself, includes a number of significant disadvantages. First, the disclosed seal does not include means for maintaining the ring member concentric with respect to the axis of the engine or with other seal components. The applicant has found that concentricity of the ring member with respect to other seal components is important for proper seal operation. Concentricity helps to maintain concentric, balanced pressure forces on the seal components. Concentric, balanced pressure forces, in turn, promote good sealing characteristics while permitting the use of smaller, more lightweight seal components. In addition, pressure forces that are not concentric with respect to the engine centerline can result in nonconcentric forces acting on critical rotor assembly components.

Second, the seal as disclosed shows the ring member pressurized radially inwardly by the higher pressure region. Rings pressurized radially inwardly will deform to an out-of-round shape with reduced sealing capability unless they are sufficiently massive and stiff. However, the ring member should ideally have a low mass inertia and relatively high compliance for reduced seal weight and, more importantly, reduced hysteresis in the clearance between the radial sealing surface and the restricting tooth. A low mass inertia ring can more quickly and efficiently track motion of the sealing surface with lower actuating forces.

Third, differential thermal growth and other effects influencing the clearance between the seal housing and face seal ring member can result in changes in pressure forces acting on seal components, which can result in poor sealing.

Fourth, the seal as disclosed includes an auxiliary restrictor tooth integral with or mounted on the ring member, which adds weight to the ring member, and increases pressure closing forces on the ring member, with the result that heavy spring means must be used to bias the ring member away from the sealing surface.

Fifth, the seal as disclosed does not efficiently vent air exiting the air bearing space and the restrictor tooth to the low pressure region. Improved venting is desired to assure proper pressure balance on the ring member.

SUMMARY OF THE INVENTION

It is therefore an advantage of the present invention to maintain a concentric relationship between gas bearing face seal components to establish concentric pressure forces on the components.

Another advantage of the present invention is a gas bearing face seal assembly with a radially outwardly pressurized face seal ring member to maintain ring shape.

Another advantage of the invention is a reduced mass inertia face seal member for reduced sealing clearance hysteresis.

Another advantage of the invention is control of clearance between a stationary seal housing and a translating face seal ring member to maintain pressure balance on seal components, notwithstanding differential growth of an engine stationary engine structure and seal housing relative to other seal components.

Another advantage of the invention is to reduced stress in the spring means biasing the face seal ring member away from the sealing surface.

A further advantage of the invention is improved venting of flow from a gas bearing face surface and a primary flow restrictor means.

The objects of the invention will be more fully understood from the drawings and the following description. Briefly, a gas bearing face seal assembly is disclosed for restricting flow from a relatively higher pressure region to a relatively lower pressure region at the juncture of an engine stationary member and an engine rotating member. The seal assembly includes a face seal ring member with a primary restrictor sealing dam, housing means including a housing structure fixed to an engine stationary structure, and a secondary seal means, which may be a piston ring seal, in sealing engagement with the housing means and the face seal ring member. The face seal ring member is mounted on the housing for movement of the primary sealing dam into a predetermined clearance with a primary sealing surface on the rotating engine member. The assembly includes support means for supporting the face seal ring member concentrically with respect to a housing surface to maintain concentric sealing forces on seal components, while permitting radial growth between the face seal ring member and a housing structure. Control ring means concentrically positioned on the housing structure may be used in high temperature applications to maintain pressure balance on seal components during differential growth of the housing structure with respect to the face seal ring member. The seal assembly is configured to utilize the high pressure region being sealed to pressurize the ring member radially outwardly, for maintaining ring roundness. In a preferred embodiment, auxiliary restricting teeth can be mounted on a structure separate from the face seal member, the teeth concentric with respect to a face seal member surface and a surface on the engine rotating member. Venting of the gas bearing space and primary restrictor flow is improved by including a vent channel turning vane and circumferentially angled vent passages to reduce pressure drop from the vent channel to the low pressure region.

BRIEF DESCRIPTION OF THE DRAWINGS

While the specification includes claims which particularly point out and distinctly claim the subject matter which the applicant considers to be his invention, a more complete understanding of the invention will be gained from the following detailed description which is given in connection with the accompanying drawings, in which:

FIG. 10 is a partial schematic illustration of a view of the face seal ring member taken along line 10—10 in FIG. 9 with washers 159 omitted for clarity.

FIG. 11 is a cross-sectional view of the face seal ring member taken along line 11—11 in FIG. 10.

FIG. 12 is a partial illustration of the face seal ring member taken along line 12—12 in FIG. 11.

DETAILED DESCRIPTION OF THE DRAWINGS

This application cross references U.S. Pat. No. 3,546,882, issued to Berkey and assigned to the assignee of the present invention and is incorporated in entirety as a reference for describing gas turbine engine operation.

Figure 1:
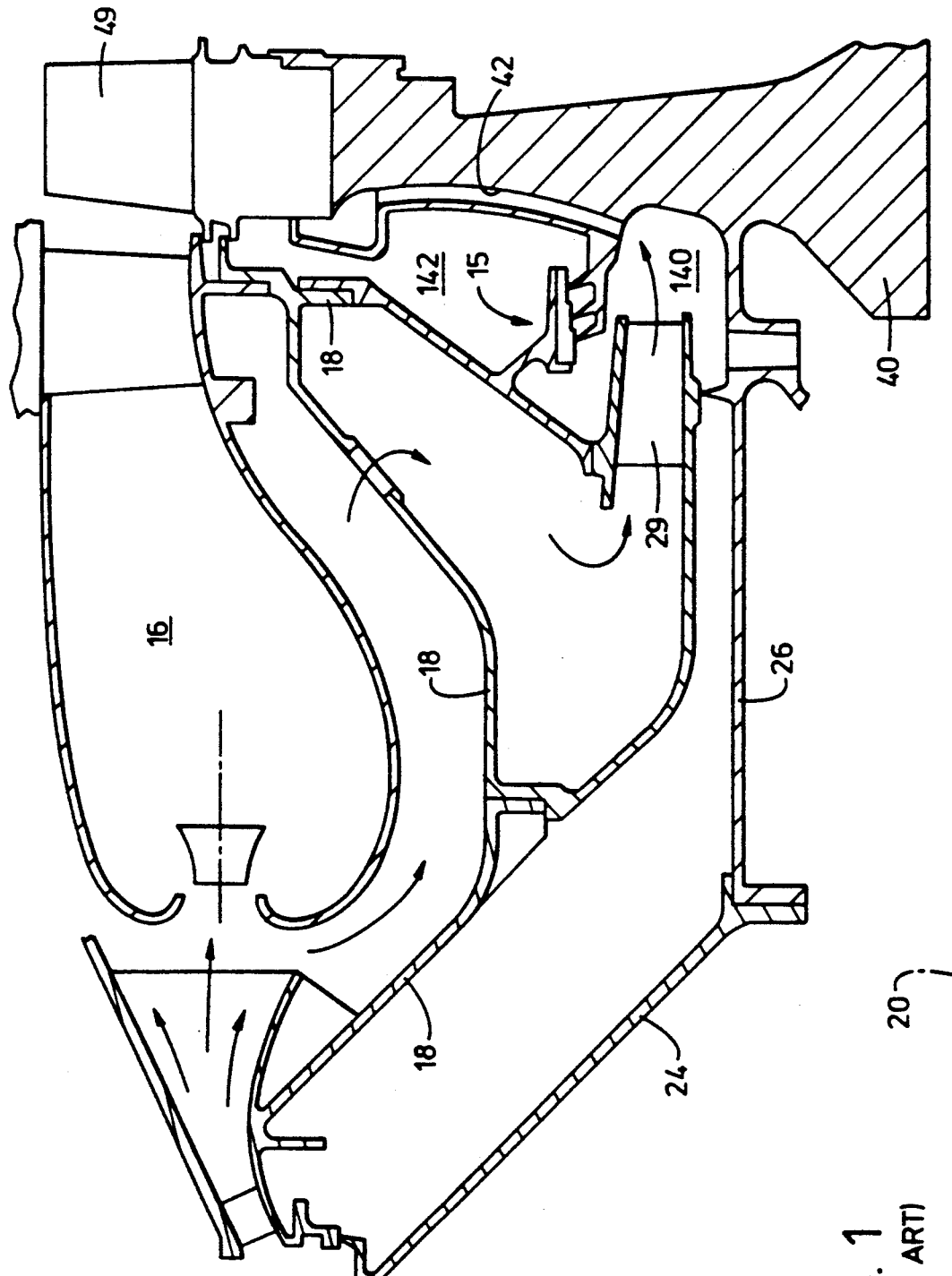
FIG. 1 is a schematic illustration of a partial cross section of a known gas turbine engine showing a conventional labyrinth seal structure.

Referring now to the drawings wherein like reference numbers are used for like elements throughout, FIG. 1 shows a schematic illustration of a known gas turbine engine including a conventional labyrinth seal assembly 15 serving as a high pressure turbine inducer seal. High pressure compressor discharge air exiting compressor 24 (only part of which is shown) is burned with fuel in combustor 16, and directed for expansion through turbine blades 49. Blades 49 are mounted on the perimeter of a turbine rotor 40, which is mounted for rotation about an engine axis 20. Torque generated by rotation of rotor 40 is transmitted through a shaft 26 to power the compressor 24 as is well known.

A portion of the high pressure compressor discharge air not burned in combustor 16 may be directed through stationary inducer vanes 29 to passages 42 in rotor 40 for cooling blades 49. Labyrinth seal 15 may be used to restrict leakage of the high pressure compressor discharge air from a relatively high pressure region 140 to a relatively low pressure region 142 at the juncture between the engine rotating member 40 and a stationary engine member 18, which may support the inducer 29.

Figures 2, 2A:
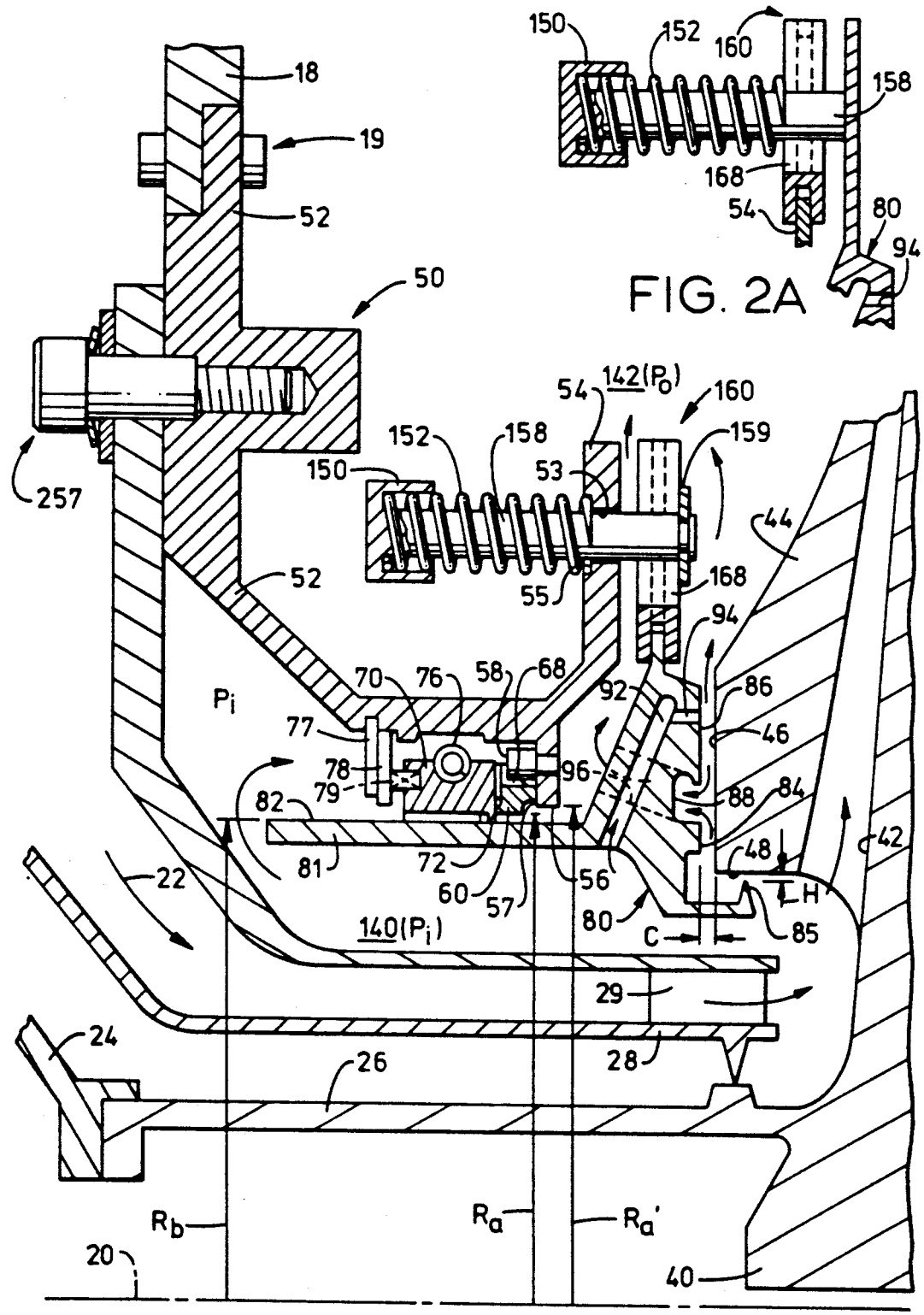
FIG. 2 is a schematic illustration of a cross-sectional view of a gas bearing face seal assembly in accordance with the present invention, shown in an open, or retracted position.
FIG. 2A is an alternative embodiment of the assembly of FIG. 2.
Figure 3:
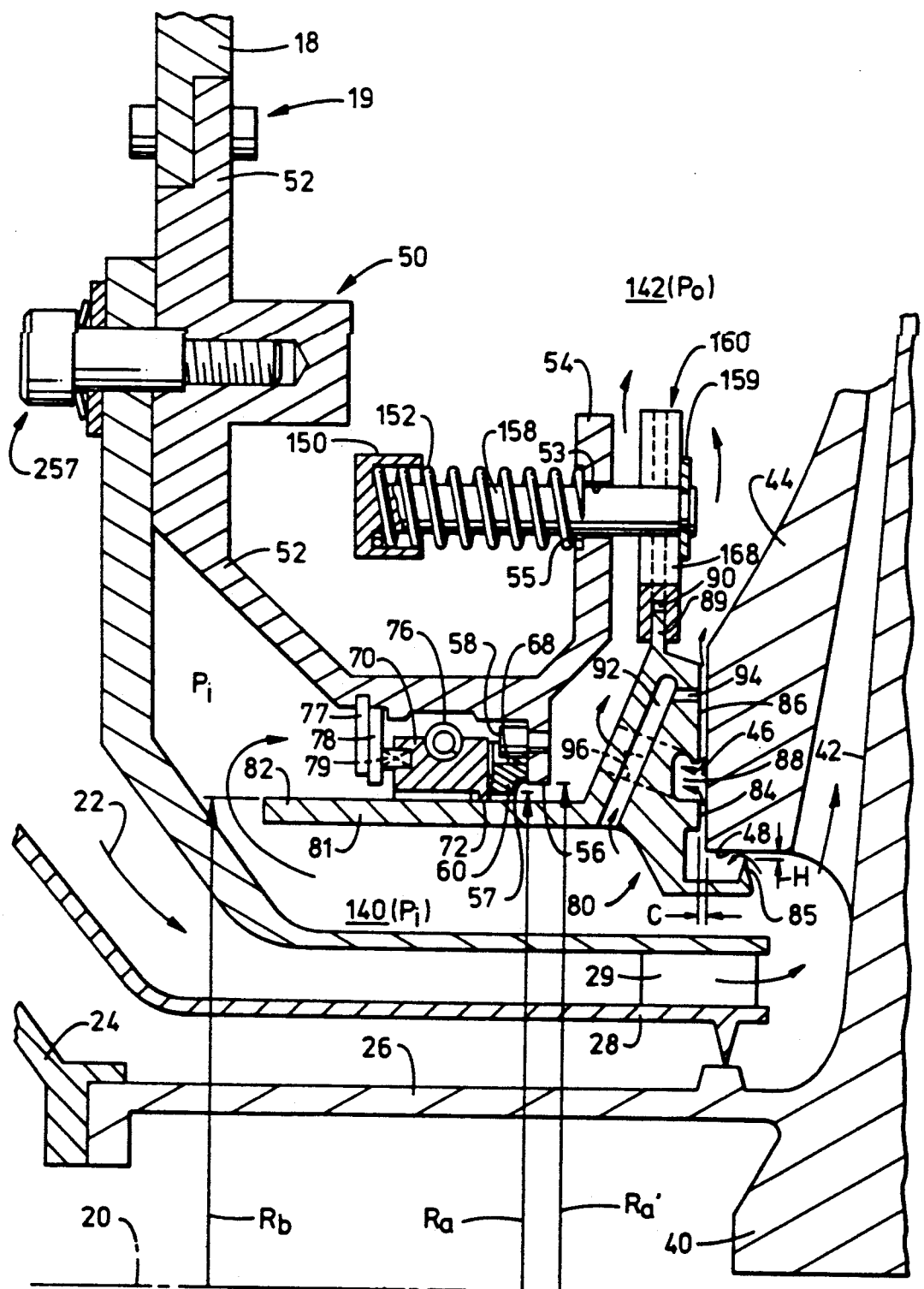
FIG. 3 is a schematic illustration of a cross-sectional view of a gas bearing face seal assembly in accordance with the present invention, shown in a closed, or sealing position.

FIGS. 2 and 3 show an embodiment of the improved gas bearing face seal of the present invention serving as the turbine inducer seal. The seal assembly includes housing means 50, which can include a housing structure 52 fixed with respect to engine stationary structure 18. A face seal means, such as a face seal ring member 80, which is preferably a circumferentially continuous ring structure, is movably supported on housing structure 52. Face seal ring member 80 is supported for movement with respect to a primary rotating sealing surface 46 on a rotating member 44, which may be attached to or integral with rotor 40. Face seal means 80 includes a primary flow restrictor means, such as a primary restrictor dam 84, and a gas bearing face surface 86 radially spaced apart from restrictor 84 by a circumferentially extending vent channel 88. Flow restrictor dam 84 is a radially and circumferentially extending surface, and is more effective in restricting flow than a circumferentially extending labyrinth tooth. Motion of face seal ring member 80 with respect to primary sealing surface 46 defines a primary gas bearing face clearance, C, separating primary flow restrictor 84 and gas bearing face surface 86 from primary sealing surface 46 on rotating member 44. An auxiliary clearance H can be defined between an auxiliary restrictor tooth 85 on face seal means 80, and an auxiliary seal surface 48 on rotating member 44. Drawing dimensions such as clearances C and H are not to scale.

Figure 4:
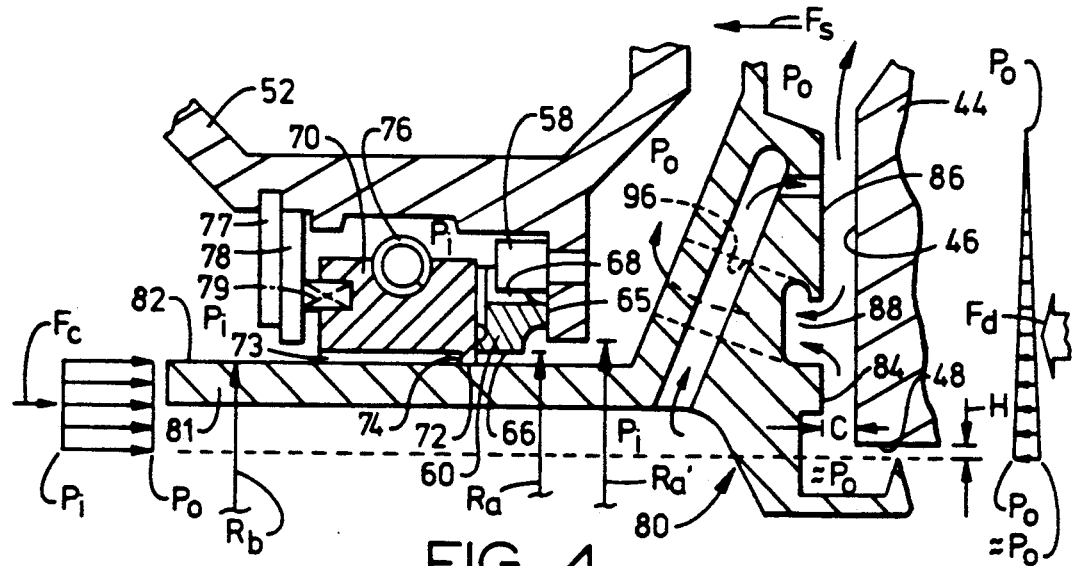
FIG. 4 is a schematic illustration of a partial cross-sectional view of the assembly of FIG. 2, showing forces acting on a face seal ring member in a retracted position.
Figure 5:
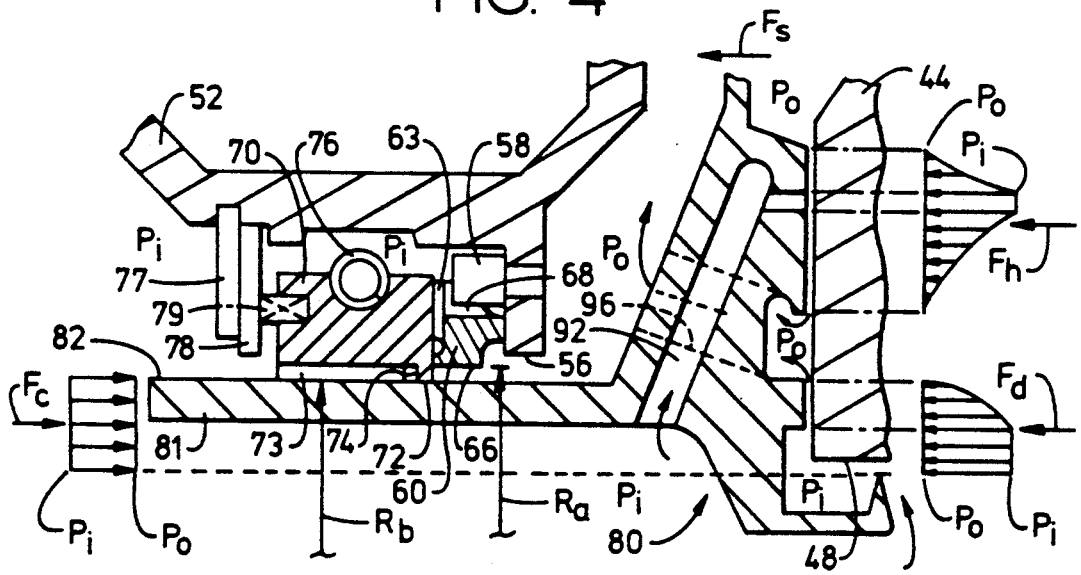
FIG. 5 is a schematic illustration of a partial cross-sectional view of the assembly of FIG. 3, showing forces acting on a face seal ring member in a sealing position.

FIG. 2 shows the face seal ring in a retracted position, and FIG. 4 shows the forces acting on the face seal ring in the retracted position. Likewise, FIG. 3 shows the face seal ring in a sealing position, and FIG. 5 shows the forces acting on the face seal ring in the sealing position. The forces shown in FIGS. 4 and 5 are shown as resultants of pressures acting on surfaces. The pressures are represented as arrows, where the direction of the arrows indicates the direction of action of the pressure, and where the length of the arrows indicates the magnitude of the pressure. Po, a gage or reference pressure, represents a relatively lower pressure in area 142, and Pi represents a relatively higher pressure in area 140.

When the engine is not operating, and the pressure Pi in area 140 essentially equals the pressure Po in area 142, spring means such as a plurality of circumferentially spaced apart coil springs 152 (only one shown in FIG. 2) act through pins 158 and 157 (FIG. 10) to generate a combined spring force Fs urging face seal ring 80 away from surface 46 on member 44. Each spring 152 can include one spring end seated in one of a plurality of circular recesses 55 in a radially and circumferentially extending flange 54 on structure 52. The other end of each spring can be seated in a cup shaped washer 150, where each washer 150 is fixedly attached to a pin 158 or a pin 157. Each pin 158 and 157 can pass through an axially extending bore 53 which can be concentric with a circular recess 55 in flange 54. Pins 158 should have a diameter sized for the minimum radial clearance within bores 53 which permits sliding of pins 158 in bores 53. Pins 158 and 157 can extend through grooves 168 and 167 (FIG. 10), respectively, on face seal ring 80. Retaining washers 159 on each pin can transmit the spring force from the pins to face seal ring 80. Alternatively, pins 158 and 157 can be fixedly attached to face seal ring 80 and extend through grooves in housing flange 54.

In the retracted position clearance C can be an order of magnitude greater than clearance H. In a sealing position, clearance C is about 0.0005 to 0.0025 inch, and may be an order of magnitude smaller than clearance H. Clearance H remains relatively constant.

As the engine is started and the compressor discharge pressure rises, pressure Pi in area 140 begins to rise. Referring to FIG. 4, the pressure differential between Pi and Po results in a closing force Fc acting on face seal ring 80. Force Fc acts against spring force Fs to urge face seal ring 80 and primary restrictor dam 84 toward surface 46. Radially outwardly extending feed passages 92 in face seal 80 intersect with axially extending orifice bores 94 to communicate pressure Pi into primary clearance C between gas bearing face 86 and surface 46. However, because clearance C is much larger than clearance H, almost the entire pressure drop between Pi and Po occurs across auxiliary clearance H. Therefore, only a small gas bearing force Fd is established on surfaces 84 and 86 to act, with Fs, to resist motion of primary restrictor 84 toward surface 46. In this mode Fc is greater than Fs plus Fd, so that ring 80 moves toward surface 46.

As face seal ring 80 reaches the sealing position shown in FIG. 5, clearance C becomes much smaller than clearance H, as described above. As a result, the pressure drop across auxiliary tooth 85 is insignificant, and the pressure drop from Pi to Po occurs substantially across clearance C between primary restrictor 84 and surface 46. Thus, gas bearing forces Fh and Fd are developed at surfaces 86 and 84 respectively which, acting with Fs, balance closing force Fc and maintain clearance C at a predetermined size, such as between 0.0005 and 0.0025 inches. The sealing position is a stable equilibrium position: relative motion of face seal ring 80 away from surface 46 will decrease forces Fh and Fd so that there is a net force urging ring 80 toward surface 46, while relative motion of ring 80 toward surface 46 will increase forces Fh and Fd, and urge ring 80 away from surface 46.

In the sealing position shown in FIGS. 3 and 5, air passing radially outwardly from clearance C at restrictor dam 84 and radially inwardly from gas bearing face surface 86 is collected in a circumferentially continuous vent channel 88. In the sealing position shown in FIGS. 3 and 5, the pressure in vent channel 88 should be substantially Po for proper force balance on ring 80 shown in FIG. 5. A plurality of circumferentially spaced apart vent passages 96 shown in phantom in FIGS. 2 through 5 (and more clearly in FIG. 10) provide pressure communication between channel 88 and low pressure region 142. Where the pressure differential between regions 140 and 142 is large, applicant has found that supplementary vent slots 98 (FIG. 10) aid in venting vent channel 88 to establish pressure Po therein. Slots 98 can be directed generally radially outwardly from vent channel 88 to open into fluid communication with region 142, and may have a rectangular cross section.

During engine operation surface 46 may move axially due to thermal growth of hot engine components. In addition, surface 46 will rarely be perfectly planar and parallel with respect to surfaces 84 and 86. Thus, surface 46 may move toward and away from surfaces 84 and 86 with each revolution of rotor 40 about axis 20. A secondary seal means, such as circumferentially extending split piston ring secondary seal 70, is provided to allow face seal ring 80 to translate axially in response to the motions of rotating surface 46 on rotor 40.

Piston ring secondary seal 70 is urged radially inwardly by spring means, such as garter spring 76, against face seal ring 80. A circumferentially extending secondary seal dam surface 72 on piston ring 70 is urged into radial sealing engagement with a radially outwardly facing face seal ring secondary sealing surface 82. Face seal ring secondary sealing surface 82 has a balance radius Rb. Surface 82 may be formed on a cylindrical body portion 81 of face seal ring 80.

Piston ring secondary seal 70 is urged axially by spring means, such as by a plurality of circumferentially spaced coil springs 79, into engagement with an axially facing and circumferentially extending housing secondary sealing surface on the housing means 50. Springs 79 may act against a circumferentially extending backing ring 78 held into position on structure 52 by a snap ring 77. Known piston ring secondary seals typically include a plurality of circumferentially spaced apart and axially extending recess grooves 73 intersecting a common circumferentially extending groove 74 for pressure distribution around the ring 70.

The housing secondary sealing surface may be a sealing surface 57 located on the housing structure 52 (FIG. 7), but is preferably a surface 67 on a control ring 60 (FIGS. 6 and 8) as will be explained below. Housing means 50 also includes a surface defining a housing secondary sealing radius. The secondary sealing radius, together with the balance radius Rb, establishes pressure balance on piston ring 70. The housing secondary seal radius can be a radius Ra' defined by a surface 56 on housing structure 52, but is preferably a radius Ra defined by a surface 66 on a control ring 60. Control ring 60 can be positioned concentrically on housing structure 52, as will be described below.

Figure 7:
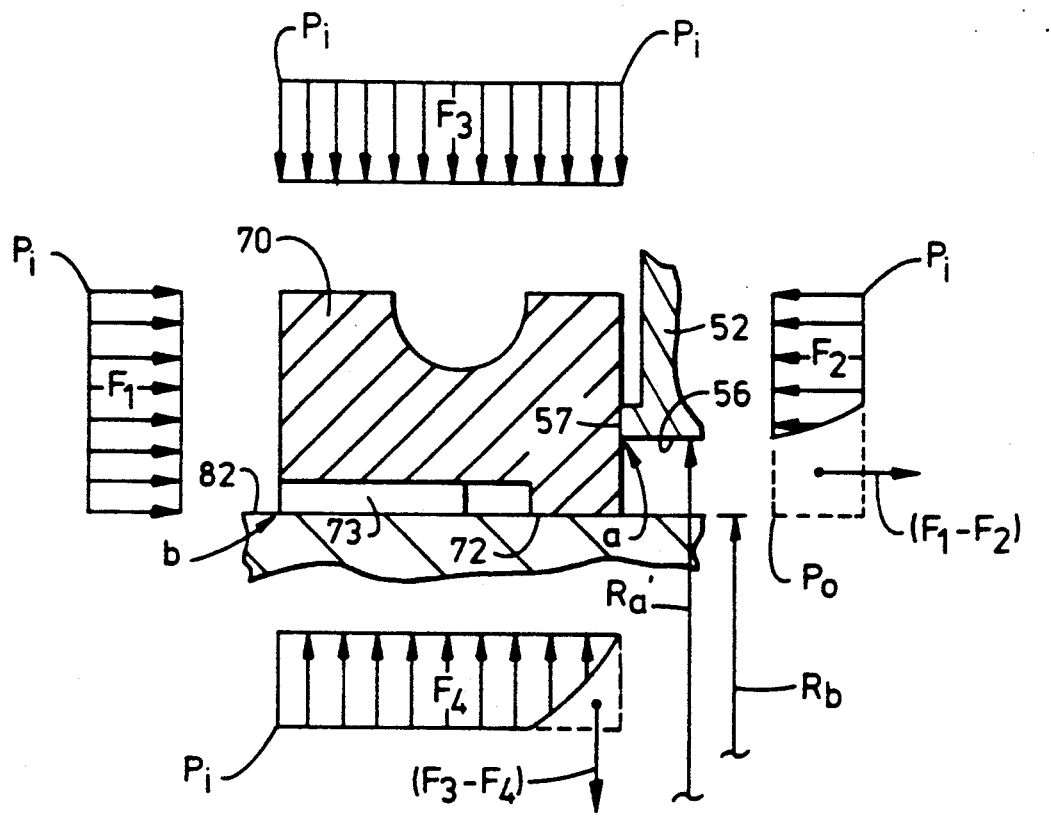
FIG. 7 is a schematic illustration of pressure forces acting on a piston ring secondary seal in the absence of a control ring.

FIG. 7 shows the pressure forces acting on secondary seal 70 in a seal assembly which does not include a control ring 60. In FIG. 7, the pressure forces that encourage seating of piston ring 70 on the face ring seal secondary seal surface 82 and on the housing secondary seal surface 57 are shown in schematic form using arrows, where the arrows represent the direction of the pressures, and where the length of the arrows represent the magnitude of the pressures. Forces F1, F2, F3, and F4 represent the resultant pressure forces acting on each of the piston ring faces. F1-F2 is the net axial pressure force acting on ring 70, and F3-F4 is the net radial pressure force acting on ring 70. Recess grooves 73 and 74, and the radial clearance between radii Rb and Ra', are ideally sized so that net axial and radial pressure forces do not cause a net twisting moment on ring 70. A net twisting moment can cause ring 70 to pivot about point a or b in FIG. 7, and result in leakage.

As the radial clearance between the face seal balance radius Rb and the housing secondary seal radius Ra' increases, the magnitude of the net axial force F1-F2 increases. One problem applicant has recognized with respect to known gas bearing face seal designs is lack of concentricity of face seal ring 80 with respect to housing means 50. Prior gas bearing face seal designs do not provide concentric positioning of face seal ring 80 with respect to housing means 50.

If Rb is not maintained concentric with respect to Ra' (that is, if face seal secondary sealing surface 82 is not maintained concentric with housing surface 56), the net axial force F1-F2 will vary around the circumference of the piston ring 70. Thus, the net axial force will be too high with respect to the net radial force around one-half of piston ring 70, the net axial force will be too low with respect to the net radial force on the other half of ring 70, and a net twisting moment on the ring will result, causing leakage.

In addition, face seal ring 80 should be maintained concentric with respect to engine axis 20 to maintain a uniform clearance H between auxiliary tooth 85 and rotor surface 48. Maintaining a circumferentially uniform clearance H reduces non-concentric pressure forces acting on critical rotor components, such as rotor 40, and permits a smaller clearance H to be used without risk of rubs at surface 48.

Figure 13:
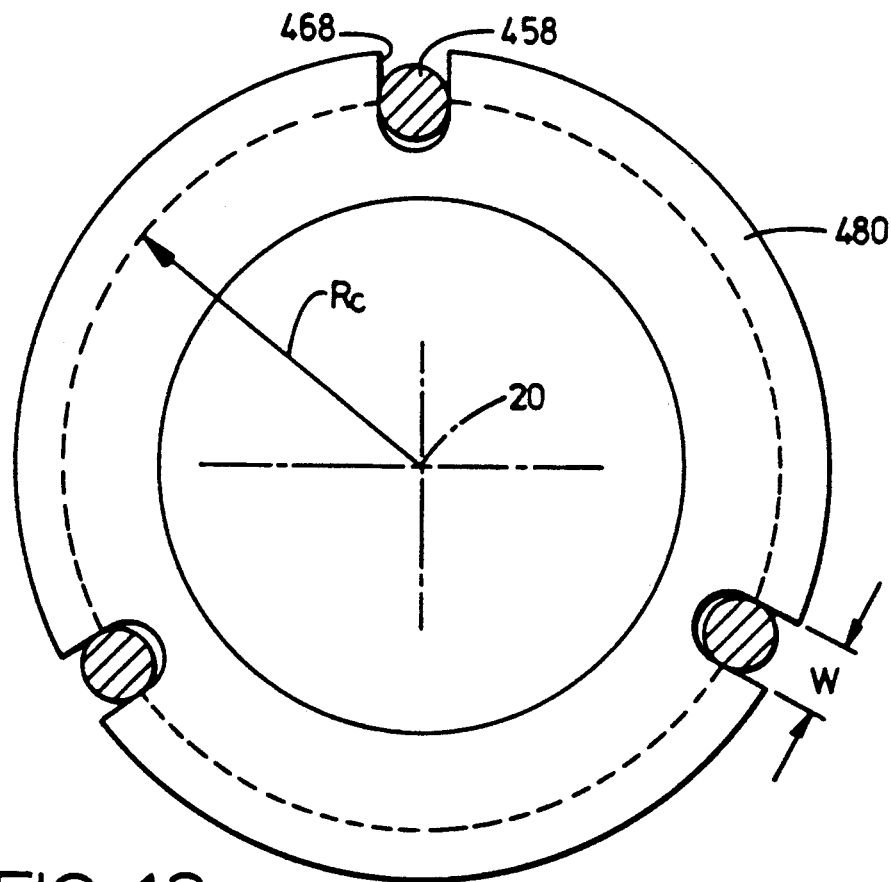
FIG. 13 is a schematic representation of a ring supported concentrically with respect to circle defined by three pins, the pins positioned in grooves which permit relative radial growth between the pins and the ring.

Applicant proposes a means for movably supporting the face seal ring 80 on the housing means which permits translation of the primary flow restrictor means 84 relative to the primary sealing surface 46, while maintaining a circumferentially uniform radial clearance between face seal ring 80 and the housing means. FIG. 13 illustrates such a support means schematically. A general ring structure 480 is positioned concentrically with respect to an axis, such as engine axis 20, by means of at least three positioning pins 458. Positioning pins are located on a radius Rc concentric with respect to an axis, which can be axis 20, and pins 458 are preferably circumferentially spaced apart at equal angular intervals.

Radially extending positioning grooves 468 are circumferentially spaced apart on ring 480 to match the angular spacing of pins 458. Grooves 468 have a circumferential width w sized slightly larger than the diameter of pins 458 to provide the minimum circumferential clearance of pins 458 in grooves 468 which permits radial and axial motion of pins 458 in grooves 468. Thus, ring 480 can be installed on pins 458 by aligning grooves 468 with pins 458 and axially positioning ring 480 over pins 458. The close fit between groove width w and the pin diameter prevents ring 480 from moving eccentrically with respect to axis 20 and radius Rc, while the radially extending grooves 468 permit radial motion (such as due to thermal growth) of the pins 458 with respect to the ring 480. Alternatively, pins 458 can have square or oval heads dimensioned with respect to w for close circumferential fit in grooves 458. Thus, ring 480 is held concentric with respect to Rc by at least three pin and radially extending groove combinations.

The face seal secondary seal surface 82, with balance radius Rb, is supported concentrically with respect to the housing secondary sealing radius Ra' (or Ra where a control ring is used) by means of at least three pin 158 (corresponding to positioning pins 458 in FIG. 13) and radially extending groove 168 (corresponding to grooves 468 in FIG. 13) combinations. Referring to FIGS. 2, 3, 9 and 10, at least three pins 158, preferably spaced 120 degrees apart circumferentially, can be positioned for close radial clearance in axial bores 53 in housing flange 54 where the bores 53 are concentrically located with respect to housing secondary seal radius Ra' (or Ra where a control ring is used). The bores are also preferably concentrically located with respect to engine axis 20. Pins 158 extend into a like number of grooves 168 located on face seal ring 80. Grooves 168 can be formed in inserts 160 located in recesses 90 on ring 80. Inserts 160 slide radially on radially extending tangs 89 for installation in recess 90. Inserts 160 are preferably formed of a high temperature, anti galling material such as a mica glass ceramic, commercially available as Macor from the Corning Glass Company.

Other pins 157 transmitting spring force Fs to ring 80 need not be precisely positioned in grooves 167 (FIG. 10) or in bores 53, but should be generally uniformily positioned around ring 80 to provide a uniform spring closing force Fc. In an alternative embodiment, at least three pins 158 can be fixed on ring 80 to define a circle concentric with respect to face seal ring secondary sealing surface 82 and balance radius Rb, with grooves 168 formed in inserts 160 positioned on housing flange 54 as shown in FIG. 2A.

Another problem characteristic of prior gas bearing face seal assemblies is the variation in radial clearance Ra'-Rb between face seal secondary sealing surface 82 and the housing surface 56 due to dynamic, pressure and thermal effects. Differential thermal expansion effects are especially important in modern gas turbine seals where seal temperatures over 1200 degrees Fahrenheit are common. Applicant has found that use of a clearance control ring can reduce both the magnitude of, and variation in the radial clearance.

Referring to FIG. 7, the housing structure 52 and engine stationary structure 18 may typically be a high temperature nickel alloy having high strength at elevated temperatures for structural load carrying capability, and represent a large thermal inertia, so that radius Ra' of surface 56 on the housing will grow thermally at a different rate than balance radius Rb of surface 82 on the face seal ring. The radial clearance Ra'-Rb must be sized to accommodate this differential thermal growth. However, as the radial clearance Ra'-Rb increases, net axial force F1-F2 on the secondary seal 70 also increases. An increase in the net axial force must be balanced by an increase in the net radial force F3-F4 (such as by increasing the axial width of piston ring dam surface 72) to resist radial friction forces at surface 57 and to prevent twisting of ring 70 due to a net twisting moment on ring 70. However, an increase in the net radial force acting on ring 70 is detrimental because such an increase will also increase the axial friction drag on face seal ring 80 at the interface of surfaces 72 and 82. Increased friction drag on ring 80 reduces the ability of ring 80 to accurately track axial motion of rotating surface 46. Where the axial motion of surface 46 is once per revolution of the rotor 40, such as may be caused by out of square mounting of the rotor with respect to axis 20, friction drag can cause a variation in primary restrictor clearance C resulting in significant leakage.

Figure 6:
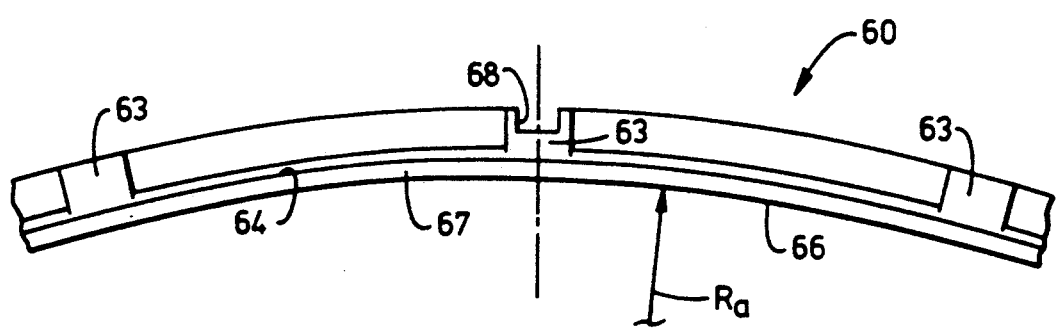
FIG. 6 is a schematic illustration of partial face view of a control ring in accordance with the present invention.
Figure 8:
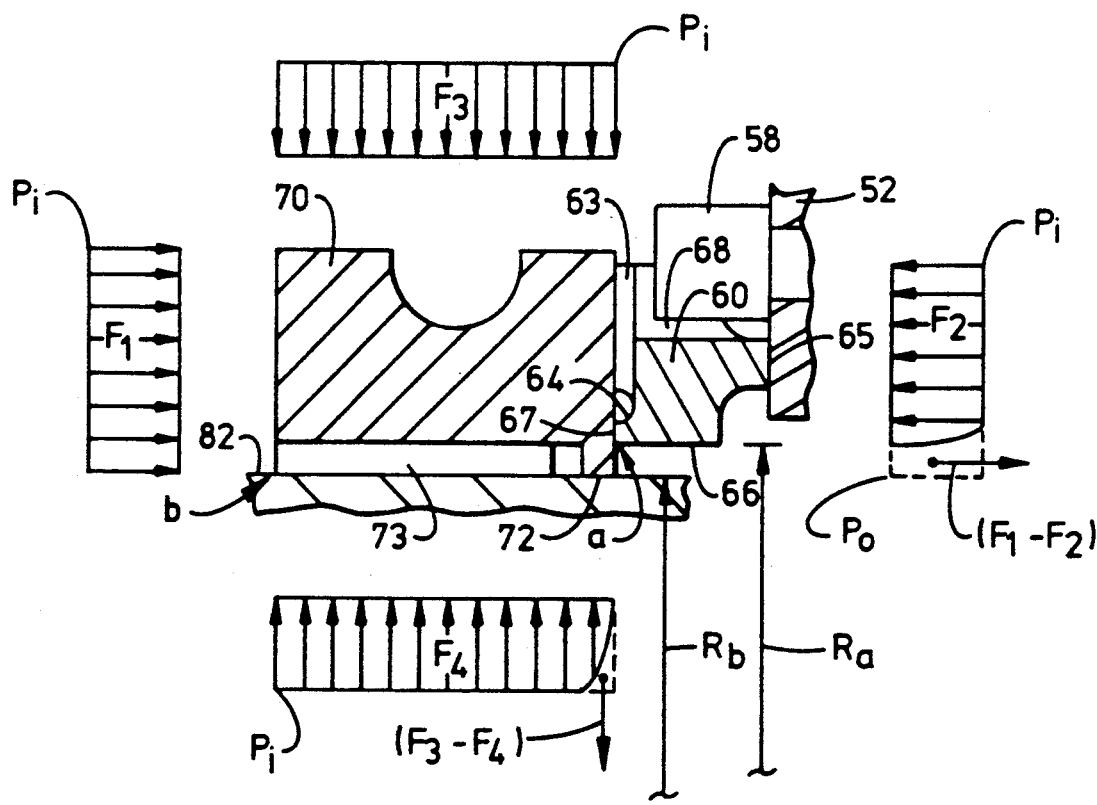
FIG. 8 is a schematic illustration of pressure forces acting on a piston ring secondary seal in a preferred embodiment of the present invention which includes a control ring.

Applicant proposes to use a clearance control ring 60 on housing means 50 to minimize the required radial clearance between face seal secondary seal surface 82 and housing means 50, as well as to minimize variations in the same radial clearance due to dynamic, pressure, and thermal effects. Referring to FIGS. 6 and 8, control ring 60 has a surface 66 defining a housing secondary seal radius Ra. Ring 60 also includes an axially facing sealing surface 67 engaging piston ring 70, and an oppositely facing sealing surface 65 engaging housing structure 52.

Ring 60 is preferably concentrically positioned on housing structure 52 with respect to the circle defined by pins 158, so that secondary seal radius Ra is concentric with respect to balance radius Rb. At least three clearance control support pins 58, which can have square heads, can be fixedly mounted to housing structure 52 to define a circle concentric with the circle defined by pins 158. Pins 58 fit closely in radially extending and axially extending slots 68 on control ring 60, in the manner schematically illustrated in FIG. 13, to maintain Ra concentric with respect to Rb. Thus, housing structure 52 can radially grow or shrink thermally (or otherwise) with respect to control ring 60 without affecting radial clearance Ra-Rb. A lightweight material with a low coefficient of thermal expansion, such as a silicon carbide, can be used for both the face seal ring 80 and the clearance control ring 60, without regard to the structural and thermal material characteristics of housing structure 52 and engine structure 18. Ring 60 may include radially extending recess grooves 63 intersecting a circumferentially extending recess groove 64 to establish proper pressure force balance on piston ring secondary seal 70.

The seal assembly shown in FIG. 2 and 3 has a further advantage over the known gas bearing face assembly in that the net radial pressure force on face seal ring 80 due to the pressure differential between Pi and Po acts radially outwardly to better maintain roundness of ring 80 for a given ring mass. A lightweight ring 80 can better track axial motion of rotating surface 46 with reduced hysteresis in clearance C.

Figure 9:
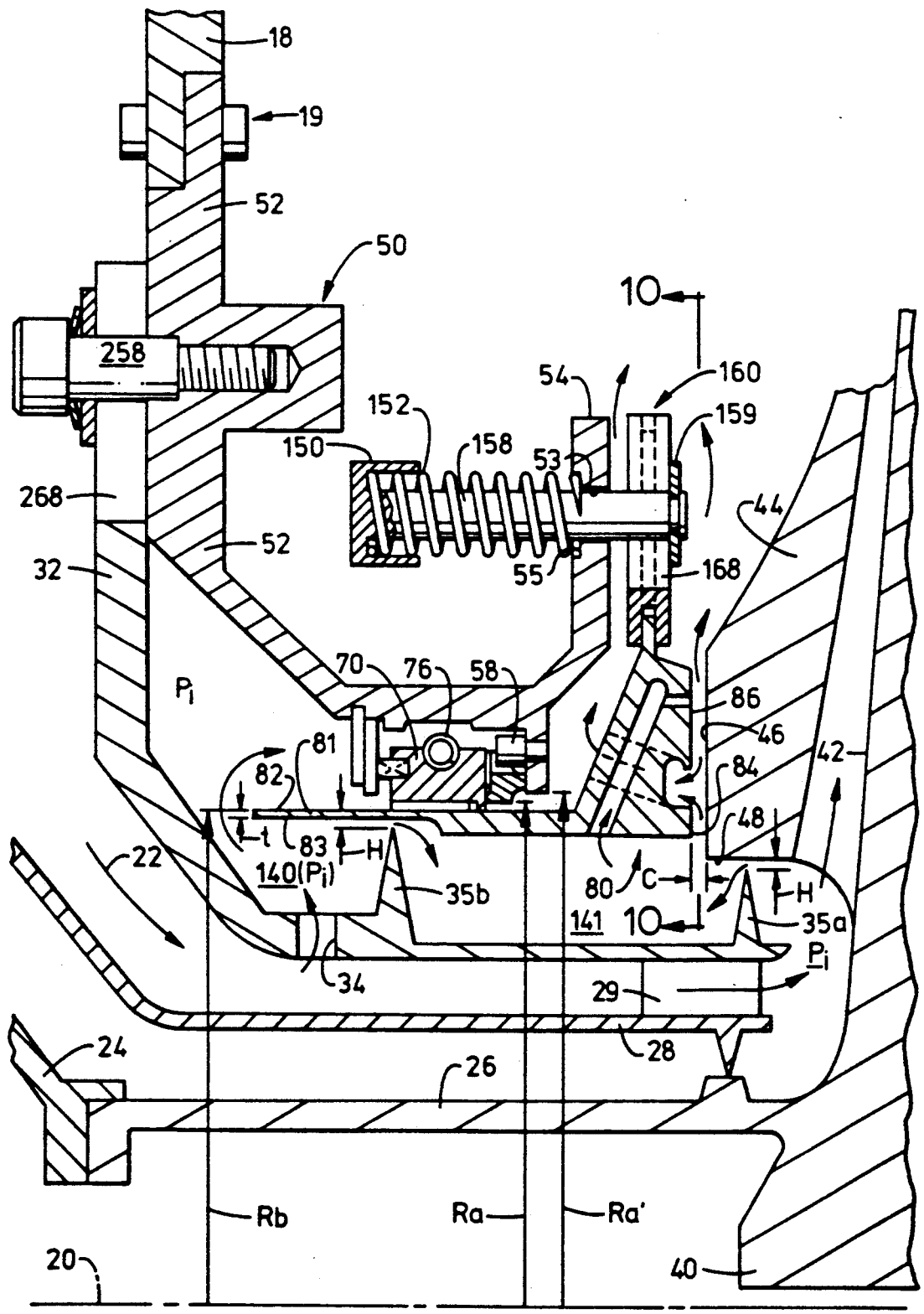
FIG. 9 is a schematic illustration of a cross-sectional view of a preferred embodiment of the invention having auxiliary restrictor means on a structure separate from the face seal ring member.

FIG. 9 shows a preferred embodiment of the present invention with auxiliary restrictor means, such as circumferentially extending teeth 35a and 35b, separate from face ring seal 80. Teeth 35a and 35b can be spaced axially apart to define an annular space 141 therebetween, where feed passages 92 and face clearance C open to space 141. Teeth 35a and 35b can be supported on a circumferentially extending auxiliary support structure 32, which may be integral with inducer 28. Space 141 may be bounded radially outwardly by face seal ring 80, and radially inwardly by structure 32.

Teeth 35a and 35b are preferably concentrically positioned with respect to engine axis 20 and face seal ring 80 to define a circumferentially uniform radial auxiliary restrictor clearance H between tooth 35a and surface 48, and between tooth 35b and a radially inwardly facing cylindrical surface 83 on face seal ring 80. Teeth 35a and 35b can be concentrically supported with respect to the circle defined by pins 158 (and thus concentric with respect to axis 20 and face seal ring surface 83) by at least three restrictor pin and radially extending groove combinations, as illustrated schematically in FIG. 13. Auxiliary restrictor positioning pins 258 can be fixed to housing structure 52 to define a circle concentric with respect to the circle defined by pins 158 and pins 58, and fit closely in complementary radially elongated grooves 268 formed in support structure 32. The pin and groove combinations provide a concentric support system while permitting relative thermal growth between housing structure 52 and support structure 32.

Supporting the auxiliary restrictor means separately from face seal ring 80 reduces the mass inertia of ring 80. Separate support for the auxiliary restrictor means also beneficially reduces pressure closing force, Fc, on face seal ring 80. In the retracted position shown in FIG. 9, face clearance C is much larger than auxiliary restrictor clearance H, so that nearly all the pressure drop from Pi to Po occurs across auxiliary restrictor teeth 35a and 35b, and the pressure in area 141 is at or very near Po. Thus, the projected axially facing pressure area on face seal ring 80 is determined by radial thickness t of the cylindrical portion 81 on ring 80. As a result, the pressure force Fc urging ring 80 to the sealing position is completely determined by radial height t. By sizing thickness t as small as manufacturing methods and material properties permit, the closing force Fc can be minimized. Thus, the required spring force Fs will be reduced, which will reduce coil stresses in spring 152. Spring coil stresses are especially critical in high temperature environments, where high temperatures and high stress levels can lead to premature fatigue failure.

Spring coil stresses are also reduced by cup shaped washer 150 and recesses 55, which serve to laterally support at least some of the spring 152 coils, and prevent spring 152 from buckling. The diameter of pins 157 and 158 could be sized to laterally support the coils of spring 152, but only by increasing the mass inertia that must be translated during axial motion of face seal ring 80.

FIGS. 10, 11 and 12 show an improved vent channel 88 and vent passages 96. Circumferentially space-apart and generally radially extending feed passages 92 (shown in phantom in FIG. 10) intersect with generally axially extending orifice bores 94, which exit on gas bearing face surface 86 to supply air at pressure Pi to the gas bearing clearance C between surface 86 and surface 46. To maintain proper pressure balance forces on ring 80, it is desirable to maintain the pressure in vent channel 88 as close to the lower pressure Po as possible when face seal ring 80 is in a sealing position. Thus, it is desirable to minimize the pressure drop from channel 88 to region 142.

Vent channel 88 collects air flowing radially outwardly through the face clearance C from restrictor dam 84, and air flowing radially inwardly through clearance C from gas bearing face surface 86. Air flowing radially outwardly from restrictor dam 84 will form a diverging jet upon entering channel 88, as illustrated by arrows 107 in FIG. 11A, and as will be appreciated by those skilled in the art of fluid sciences.

Figure 11A:
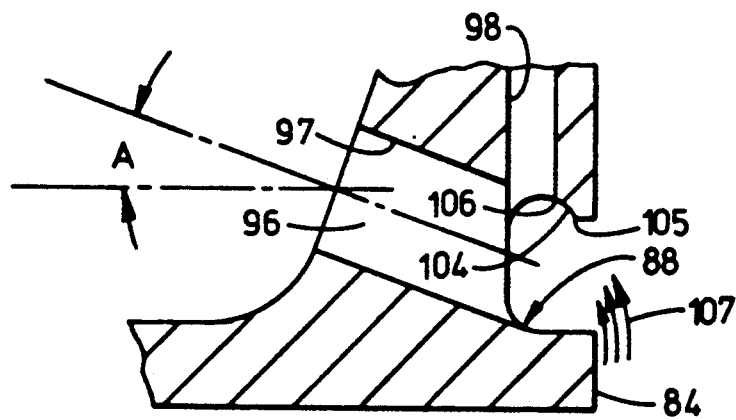
FIG. 11A is a schematic illustration of a cross-sectional view of a turning vane profile.

Channel 88 can include a turning vane surface 104, which is preferably circumferentially continuous. Turning vane surface 104 can have a smoothly curved profile to smoothly turn a substantial portion of the diverging jet exiting restrictor dam 84 axially into vent channels 96. The profile of surface 104 is preferably a circular arc segment, as shown in FIG. 11A, with a first end 105 having a generally radially outwardly directed tangent. By smoothly turning a substantial portion of the diverging jet exiting restrictor dam 84, turning vane surface 104 minimizes the carryover of the momentum of the jet 107 to the air exiting clearance C at surface 86. Thus, less of the jet's velocity will be recovered as a static pressure rise than in known channel designs, which have a flat channel surface generally perpendicular to the jet flow. Portions of the turning vane surface 104 circumferentially aligned with vent passages 96 can have a profile with a second end 106 having a tangent generally parallel to a wall surface 97 of channel 96.

To further reduce the static pressure recovery of flow entering channel 88, vent passages 96 can be angled both radially by angle A (FIG. 11) and circumferentially by angle B (FIG. 12). Passages 96 are preferably angled radially outwardly from channel 88 and angled circumferentially from channel 88 in the direction of rotation of surface 46 (indicated by arrow 41 in FIGS. 10 and 12) to reduce the momentum change of the flow entering passages 96. Angles A and B are preferably about 20 degrees and about 30 degrees, respectively.

To increase the flow area of vent passages 96 for further reduction in the pressure drop between channel 88 and region 142, vent passages 96 are preferably circumferentially elongated, having a circumferential width greater than a radial height. Thus, the flow area of individual passages 96 can be made larger than the flow area of known circular vent passages, without increasing the radial spacing of restrictor dam 84 and gas bearing face 86. An increased radial height of restrictor dam 84 is advantageous for effective flow restriction. However, it is desirable to minimize the overall combined radial height of the restrictor dam 84, channel 88, and surface 86 to better accommodate any misalignment of rotating surface 46 with respect to dam 84 and surface 86. The greater the over all combined radial height, the more difficult it is to maintain clearance C without rubbing when surface 46 is not exactly parallel to dam 84 and surface 86. Supplementary vent slots 98 can be used to further increase the flow area from vent channel 88 to region 142.

Tests of a gas bearing face seal incorporating the advantages of the present invention were carried out for comparison with a comparable four tooth labyrinth tooth design. The primary restrictor dam was located on a 15 inch diameter with respect to the axis of rotation of the rotating member, with a 0.0015 inch primary restrictor clearance C. The test ran 230 hours at 5000 rpm (330 feet per second primary sealing surface speed on the rotating member) at 950 degrees Fahrenheit and 85 psi pressure differential. The leakage rate was 0.165 lbm/sec, representing an eighty percent reduction over the comparable labyrinth seal design having a 15 inch diameter. A ninety percent reduction is predicted for a larger, 37 inch diameter seal.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope of the invention. For instance, the invention has been described as a turbine inducer seal, but can also be adapted to provide a compressor discharge pressure seal or a pressure balance seal in a gas turbine engine. Further, in some applications the housing structure may be an integral extension of the engine stationary member. Therefore, it is intended that the invention not be limited to the particular embodiment disclosed as the best mode contemplated for carrying out this invention, but that the invention will include all embodiments falling within the scope of the appended claims.

I claim:

1. A gas bearing face seal assembly for use in a gas turbine engine to restrict fluid flow from a relatively higher pressure region to a relatively lower pressure region at a juncture of an engine stationary member and an engine rotating member mounted for rotation about an axis, the assembly comprising:
   (a) a face seal ring member including a gas bearing face surface, a primary flow restrictor means, passage means disposed in the face seal ring member for providing fluid communication between the higher pressure region and the gas bearing face surface, gas bearing vent means disposed in the face seal ring member, the vent means in flow communication with the relatively lower pressure region, and a first secondary sealing surface;
   (b) seal housing means including a second secondary sealing surface and a housing structure fixedly attached to the engine stationary member;
   (c) face seal ring support means including at least three pin and radially extending groove combinations, the pins positioned on one of the face seal ring member and the housing structure, and the grooves disposed on the other of the face seal ring member and the housing structure, the pin and groove combinations concentrically supporting the face seal ring member on the seal housing means for movement from a retracted position to establish a primary restrictor clearance between the primary flow restrictor means and a primary sealing surface on the engine rotating member, the face seal ring support means maintaining a circumferentially uniform radial clearance between the face seal ring and the seal housing means; and (d) secondary seal means biased into sealing engagement with the first and second secondary seal surfaces; and (e) wherein said primary flow restrictor means comprises a primary restrictor dam having a radially and circumferentially extending seal dam surface which is radially spaced apart from said gas bearing face surface, said primary restrictor dam being more effective in restricting fluid flow from the relatively higher pressure region to the relatively lower pressure region than a circumferentially extending labyrinth tooth.

2. A gas bearing face seal assembly for use in a gas turbine engine to restrict fluid flow from a relatively higher pressure region to a relatively lower pressure region at a juncture of an engine stationary member and an engine rotating member mounted for rotation about an axis, the assembly comprising:

(a) a face seal ring member including a gas bearing face surface, a primary flow restrictor means, passage means disposed in the face seal ring member for providing fluid communication between the higher pressure region and the gas bearing face surface, gas bearing vent means disposed in the face seal ring member, the vent means in flow communication with the relatively lower pressure region, and a first secondary sealing surface;

(b) seal housing means including a second secondary sealing surface and a housing structure fixedly attached to the engine stationary member;

(c) face seal ring support means including at least three pin and radially extending groove combinations, the pins positioned on one of the face seal ring member and the housing structure, and the grooves disposed on the other of the face seal ring member and the housing structure, the pin and groove combinations concentrically supporting the face seal ring member on the seal housing means for movement from a retracted position to establish a primary restrictor clearance between the primary flow restrictor means and a primary sealing surface on the engine rotating member, the face seal ring support means maintaining a circumferentially uniform radial clearance between the face seal ring and the seal housing means; and (d) secondary seal means biased into sealing engagement with the first and second secondary seal surfaces; and (e) wherein the face seal ring member is pressurized radially outwardly by a pressure differential between the higher pressure region and the lower pressure region.

3. The assembly of claim 2, wherein the grooves are formed in inserts comprising a high temperature, gall resistant material.

4. A gas bearing face seal assembly for use in a gas turbine engine to restrict fluid flow from a relatively higher pressure region to a relatively lower pressure region at a juncture of an engine stationary member and an engine rotating member mounted for rotation about an axis, the assembly comprising:

(a) a face seal ring member including a gas bearing face surface, a primary flow restrictor means, passage means disposed in the face seal ring member for providing fluid communication between the higher pressure region and the gas bearing face surface, gas bearing vent means disposed in the face seal ring member, the vent means in flow communication with the relatively lower pressure region, and a first secondary sealing surface;

(b) seal housing means including a second secondary sealing surface and a housing structure fixedly attached to the engine stationary member;

(c) face seal ring support means including at least three pin and radially extending groove combinations, the pins positioned on one of the face seal ring member and the housing structure, and the grooves disposed on the other of the face seal ring member and the housing structure, the pin and groove combinations concentrically supporting the face seal ring member on the seal housing means for movement from a retracted position to establish a primary restrictor clearance between the primary flow restrictor means and a primary sealing surface on the engine rotating member, the face seal ring support means maintaining a circumferentially uniform radial clearance between the face seal ring and the seal housing means; and (d) secondary seal means biased into sealing engagement with the first and second secondary seal surfaces; and (e) wherein the seal housing means includes a clearance control ring, the control ring including the second secondary sealing surface and a surface defining a housing secondary seal radius.

5. The assembly of claim 4, wherein the clearance control ring is supported on the housing structure by at least three control ring pin and radially extending groove combinations permitting radial growth of the control ring independent of the housing structure.

6. A gas bearing face seal assembly for use in a gas turbine engine to restrict flow from a relatively higher pressure region to a relatively lower pressure region at a juncture of an engine stationary member and an engine rotating member mounted for rotation about an axis, the assembly comprising:

(a) a face seal ring member including a gas bearing face surface, a primary flow restrictor means, passage means disposed in the face seal ring member for providing fluid communication between the higher pressure region and the gas bearing face surface, gas bearing vent means disposed in the face seal ring member, the vent means in flow communication with the relatively lower pressure region, and a first secondary sealing surface;

(b) seal housing means including a second secondary sealing surface and a housing structure fixedly attached to the engine stationary member;

(c) face seal ring support means including at least three pin and radially extending groove combinations, the pins positioned on one of the face seal ring member and the housing structure, and the grooves disposed on the other of the face seal ring member and the housing structure, the pin and groove combinations concentrically supporting the face seal ring member on the seal housing means for movement from a retracted position to establish a primary restrictor clearance between the primary flow restrictor means and a primary sealing surface on the engine rotating member, the face seal ring support means maintaining a circumferentially uniform radial clearance between the face seal ring and the seal housing means;

(d) secondary seal means biased into sealing engagement with the first and second secondary seal surfaces; and (e) at least two auxiliary flow restrictor means supported from the engine stationary member separately from the face seal means, at least one restrictor means spaced from the face seal means to define a first auxiliary flow restrictor clearance therebetween, and at least one auxiliary flow restrictor means spaced from an auxiliary rotating surface on the engine rotating member to define a second auxiliary flow restrictor clearance therebetween.

7. A gas bearing face seal assembly for use in a gas turbine engine to restrict fluid flow from a relatively higher pressure region to a relatively lower pressure region at a juncture of an engine stationary member and an engine rotating member mounted for rotation about an axis, the assembly comprising:

(a) a face seal ring member including a gas bearing face surface, a primary flow restrictor means, passage means disposed in the face seal ring member for providing fluid communication between the higher pressure region and the gas bearing face surface, gas bearing vent means disposed in the face seal ring member, the vent means in flow communication with the relatively lower pressure region, and a first secondary sealing surface;

(b) seal housing means including a second secondary sealing surface and a housing structure fixedly attached to the engine stationary member;

(c) face seal ring support means including at least three pin and radially extending groove combinations, the pins positioned on one of the face seal ring member and the housing structure, and the grooves disposed on the other of the face seal ring member and the housing structure, the pin and groove combinations concentrically supporting the face seal ring member on the seal housing means for movement from a retracted position to establish a primary restrictor clearance between the primary flow restrictor means and a primary sealing surface on the engine rotating member, the face seal ring support means maintaining a circumferentially uniform radial clearance between the face seal ring and the seal housing means; and (d) secondary seal means biased into sealing engagement with the first and second secondary seal surfaces; and (e) wherein the face seal ring member includes the gas bearing face surface and the primary flow restrictor means spaced apart radially by a circumferentially extending vent channel, a plurality of vent passages in flow communication with the lower pressure region, the passages angled radially from the vent channel and angled circumferentially from the vent channel in a direction of rotation of the rotating member, and wherein the vent channel includes a circumferentially extending turning vane surface, the turning vane surface having a smoothly curved profile for turning a portion of a flow exiting the primary restrictor means into the vent passages.

8. The assembly of claim 7, wherein the vent passages are angled radially outwardly from the vent channel, and wherein the face seal ring member includes a plurality of supplementary vent slots in flow communication with the lower pressure region and extending radially outwardly from the vent channel.

9. A gas bearing face seal assembly for use in a gas turbine engine to restrict fluid flow from a relatively higher pressure region to a relatively lower pressure region at a juncture of an engine stationary member and an engine rotating member mounted for rotation about an axis, the assembly comprising:

(a) a face seal ring member including a primary flow restrictor means and a first secondary sealing surface;

(b) a clearance control ring including a second secondary sealing surface;

(c) clearance control support means for supporting the clearance control ring on the engine stationary member for radial growth of the clearance control ring independent of the radial growth of the engine stationary member;

(d) means for supporting the face seal ring member on the engine stationary member for translation of the primary flow restrictor means relative to a primary sealing surface on the rotating member to establish a primary restrictor clearance therebetween; and (e) secondary seal means biased into sealing engagement with the first and second secondary sealing surfaces.

10. The assembly of claim 9, wherein the clearance control ring support means includes at least three control ring pin and radially extending groove combinations, the pins positioned on one of the clearance control ring and the engine stationary structure, and the grooves disposed in the other of the clearance control ring and the engine stationary structure.

11. The assembly of claim 10, wherein the pins of the control ring pin and groove combinations are fixedly positioned on the engine stationary structure, and wherein the grooves are disposed in the clearance control ring.

12. The assembly of claim 10, wherein the face seal ring support means includes at least three face seal ring pin and radially extending groove combinations, wherein the pins of the face seal ring pin and groove combinations are positioned on one of the face seal ring member and the engine stationary structure, and the grooves of the face seal ring pin and groove combinations are disposed in the other of the face seal ring member and the engine stationary structure, and wherein the pins of the face seal ring pin and groove combinations are concentrically positioned with respect to a circle defined by the pins of the control ring pin and groove combinations.

13. The assembly of claim 12, wherein the grooves of the face seal ring pin and groove combinations are formed in high temperature, anti-galling inserts slidably positioned on the face seal ring member.

14. The assembly of claim 12, wherein the assembly includes at least two auxiliary flow restrictor means supported from the engine stationary structure separately from the face seal means, at least one restrictor means spaced from the face seal means to define a first auxiliary flow restrictor clearance therebetween, and at least one auxiliary flow restrictor means spaced from an auxiliary rotating surface on the engine rotating member to define a second auxiliary flow restrictor clearance therebetween.

15. The assembly of claim 9, wherein the face seal ring member is pressurized radially outwardly by a pressure differential between the higher pressure region and the lower pressure region.

16. The assembly of claim 9, including at least two auxiliary flow restrictor means supported from the engine stationary structure separately from the face seal ring member, at least one auxiliary restrictor means spaced from the face seal means to define a first auxiliary flow restrictor clearance therebetween, and at least one auxiliary flow restrictor means spaced from an auxiliary rotating surface on the engine rotating member to define a second auxiliary flow restrictor clearance therebetween.

17. The assembly of claim 9, wherein the face seal ring member includes a gas bearing face surface and the primary flow restrictor means spaced apart radially by a circumferentially extending vent channel, a plurality of vent passages in flow communication with the lower pressure region and angled radially from the vent channel and angled circumferentially from the vent channel in a direction of rotation of the rotating member.

18. The assembly of claim 9, wherein the face seal ring member includes a gas bearing face surface and the primary flow restrictor means spaced apart radially by a circumferentially extending vent channel, a plurality of vent passages in flow communication with the lower pressure region, and the vent channel includes a circumferentially extending turning vane surface, the turning vane surface having a smoothly curved profile for turning a portion of a flow exiting the primary restrictor means into the vent passages.

19. A gas bearing face seal assembly for use in a gas turbine engine to restrict fluid flow from a relatively higher pressure region to a relatively lower pressure region at a juncture of an engine stationary member and an engine rotating member mounted for rotation about an axis, the assembly comprising:
(a) a face seal ring member including a primary flow restrictor means and a first secondary sealing surface;
(b) seal housing means including a second secondary sealing surface and a housing structure fixedly attached to the engine stationary member;
(c) means for movably supporting the face seal ring member on the seal housing means for movement of the primary flow restrictor means relative to a primary sealing surface on the engine rotating member to establish a primary restrictor clearance therebetween;
(d) means for supporting at least two auxiliary flow restrictor means from the engine stationary structure independently of the face seal ring member, at least one auxiliary flow restrictor means spaced from the face seal ring member to establish a first auxiliary flow restrictor clearance therebetween, and at least one auxiliary flow restrictor means spaced from a second sealing surface on the engine rotating member to define a second auxiliary flow restrictor clearance therebetween; and
(e) secondary seal means biased into sealing engagement with the first and second secondary seal surfaces.

20. The assembly as recited in claim 19, wherein the means for supporting the auxiliary restrictor means includes an auxiliary restrictor support structure and at least three restrictor pin and radially extending groove combinations, wherein the pins of the restrictor pin and groove combinations are fixedly positioned on one of the housing means and the auxiliary restrictor support structure, and the grooves of the restrictor pin and groove combinations are positioned on the other of the housing means and the auxiliary restrictor support structure.

21. The assembly as recited in claim 20, wherein the housing means includes the secondary sealing surface disposed on a clearance control ring;
a clearance control ring support means for supporting the clearance control ring on the housing structure including at least three control ring pin and radially extending groove combinations, wherein the pins of the control ring pin and groove combinations are positioned on one of the housing structure and clearance control ring, and the grooves of the control ring pin and groove combinations are disposed in the other of the housing structure and the clearance control ring;
wherein the face seal ring support means includes at least three face seal ring pin and radially extending groove combinations, wherein the pins of the face seal ring pin and groove combinations are positioned on one of the face seal ring and the housing structure, and the grooves of the face seal ring pin and groove combinations are disposed in the other of the face seal ring and housing structure, and wherein the pins of the face seal ring pin and groove combinations and the pins of the restrictor pin and groove combinations are concentrically positioned with respect to a circle defined by the pins of the control ring pin and groove combinations.

22. The face seal ring member of claim 21, wherein the vent passages are circumferentially elongated to have a circumferential width greater than a radial height.

23. A face seal ring member for use in a gas bearing face seal to restrict fluid flow from a relatively high pressure region to a relatively low pressure region at a juncture of a stationary member and a rotating member mounted for rotation about an axis in a gas turbine engine, the face seal ring member comprising:
(a) a radially and circumferentially extending gas bearing face surface;
(b) a circumferentially extending flow restrictor means radially spaced from the gas bearing face surface by a circumferentially extending vent channel;
(c) a plurality of vent passages in flow communication with the lower pressure region, the passages angled radially from the vent channel and angled circumferentially from the vent channel in a direction of rotation of the rotating member.

24. The face seal ring member of claim 23, including a plurality of supplementary vent slots directed generally radially outwardly from the vent channel into flow communication with the lower pressure region.

25. The face seal ring member of claim 23, wherein the vent channel includes a circumferentially extending turning vane surface having a smoothly curved profile for turning a portion of a flow from the flow restrictor means into the vent passages.

26. A method of restricting fluid flow from a relatively higher pressure region to a relatively lower pressure region at a juncture of an engine stationary structure and a rotating member mounted for rotation about an axis in a gas turbine engine, the method comprising the steps of:
(a) supporting a face seal ring member on a stationary engine structure for biased movement of a primary restrictor means with respect to a primary sealing surface on the rotating member;

(b) supporting a clearance control ring on the engine stationary structure for radial growth of the clearance control ring independent of radial growth of the engine stationary structure; and (c) biasing a secondary seal member into sealing engagement with a first secondary sealing surface on the face seal ring member and a second secondary sealing surface positioned on the clearance control ring.

27. The method of restricting fluid flow as recited in claim 26, including a step of guiding the face seal ring member with at least three pin and radially extending groove combinations to permit radial and axial motion of the face seal ring member with respect to the stationary engine structure while restraining circumferential motion of the face seal ring member with respect to the stationary engine structure.

28. The method of restricting fluid flow as recited in claim 27, including a step of guiding a control ring defining the secondary seal radius, on the engine stationary structure with at least three control pin and radially extending groove combinations to permit radial motion of the control ring with respect to the engine stationary structure while restraining circumferential motion of the control ring with respect to the stationary structure, the step of supporting auxiliary restrictor means independently of the face seal ring member to define auxiliary restrictor clearances with respect to the face seal ring member and the rotating member by positioning the auxiliary restrictor means on the stationary engine structure with at least three restrictor pin and radially extending groove combinations to permit radial motion of the restrictor means with respect to the engine stationary structure while restraining circumferential motion of the restrictor means with respect to the engine stationary structure, and the step of concentrically positioning the pins of the face seal ring pin and groove combinations and the pins of the restrictor pin and groove combinations with respect to the pins of the control ring pin and groove combinations.

29. The method of restricting fluid flow as recited in claim 26, including a step of guiding the control ring with at least three pin and radially extending groove combinations to permit radial motion of the control ring with respect to the engine stationary structure while restraining circumferential motion of the control ring with respect to the stationary engine structure.

30. The method of restricting fluid flow as recited in claim 26, including a step of supporting auxiliary restrictor means independently of the face seal ring member to define auxiliary restrictor clearances with respect to the face seal ring member and the rotating member.

* * * * *